United States Patent [19]
Wilson et al.

[11] 3,871,125
[45] Mar. 18, 1975

[54] MECHANICAL FLY SWATTER

[76] Inventors: Johnnie Wilson; Robert F. Christensen, both of P.O. Box 846, Miles City, Mont. 59301

[22] Filed: Mar. 27, 1974

[21] Appl. No.: 455,325

[52] U.S. Cl. ............................................. 43/135
[51] Int. Cl. .......................................... A01m 3/02
[58] Field of Search ..................................... 43/135

[56] References Cited
UNITED STATES PATENTS

| | | | |
|---|---|---|---|
| 980,633 | 1/1911 | Hayden | 43/135 |
| 1,152,234 | 8/1915 | Snipes | 43/135 |
| 1,457,674 | 6/1923 | Kennedy et al. | 43/135 |
| 2,140,875 | 12/1938 | Kahler | 43/135 |
| 2,189,360 | 2/1940 | Haviland | 43/135 |
| 3,292,299 | 12/1966 | Mettler | 43/135 |

*Primary Examiner*—Warner H. Camp
*Attorney, Agent, or Firm*—Clarence A. O'Brien; Harvey B. Jacobson

[57] ABSTRACT

The handle arm of a fly swatter is connected to a pivot wheel projecting from a frame member. An actuating spring anchored to and protectively enclosed by the frame member, extends about the pivot wheel and is connected to the swatter arm. A latch holds the pivot wheel in a loaded position from which it is released by a finger operated trigger to actuate the swatter by the tension in the spring. In one embodiment, an optically reflective sighting device is mounted on the frame.

19 Claims, 9 Drawing Figures

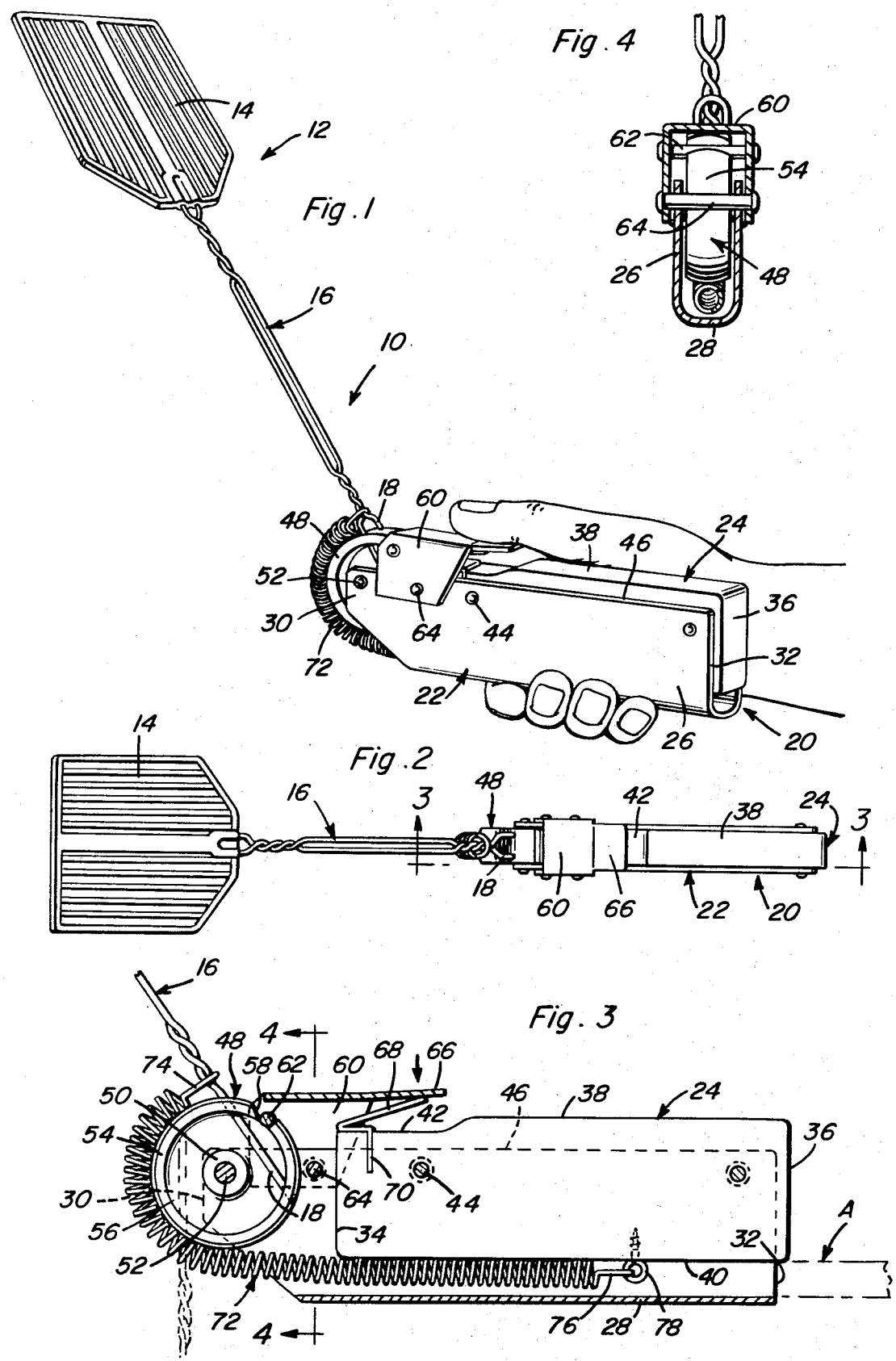

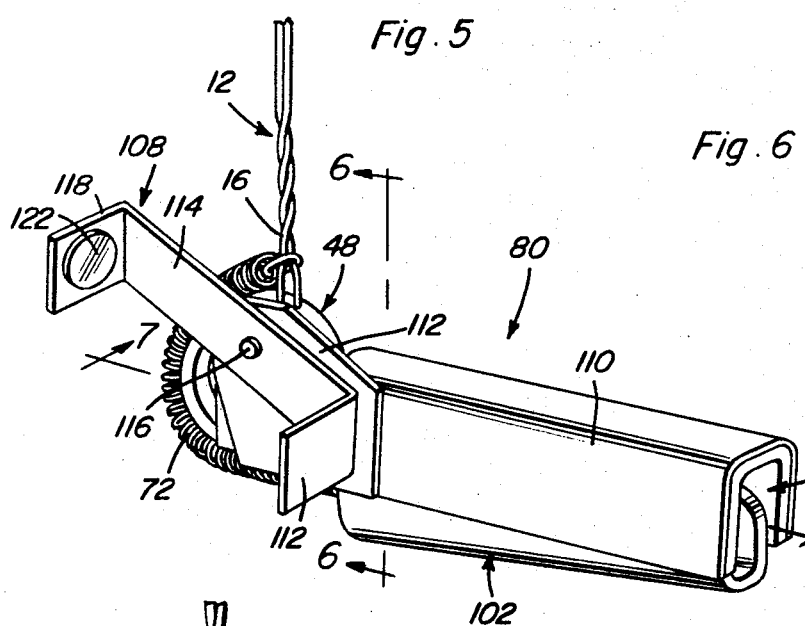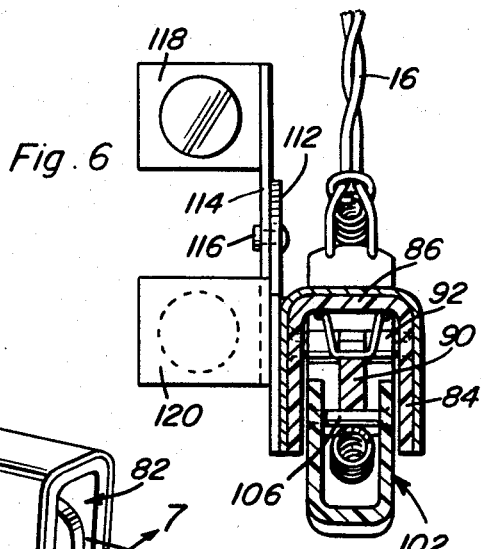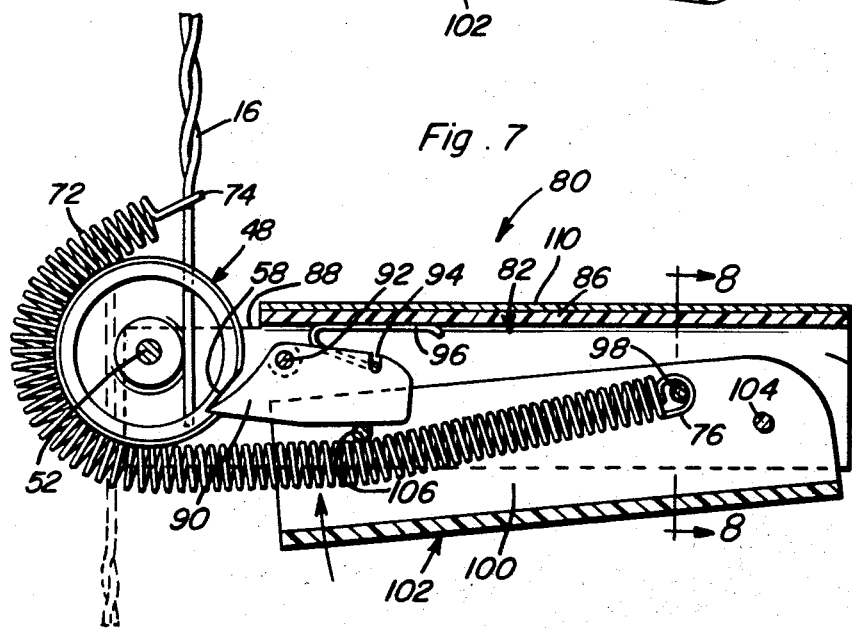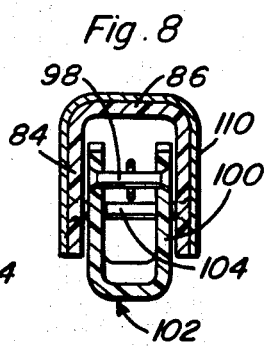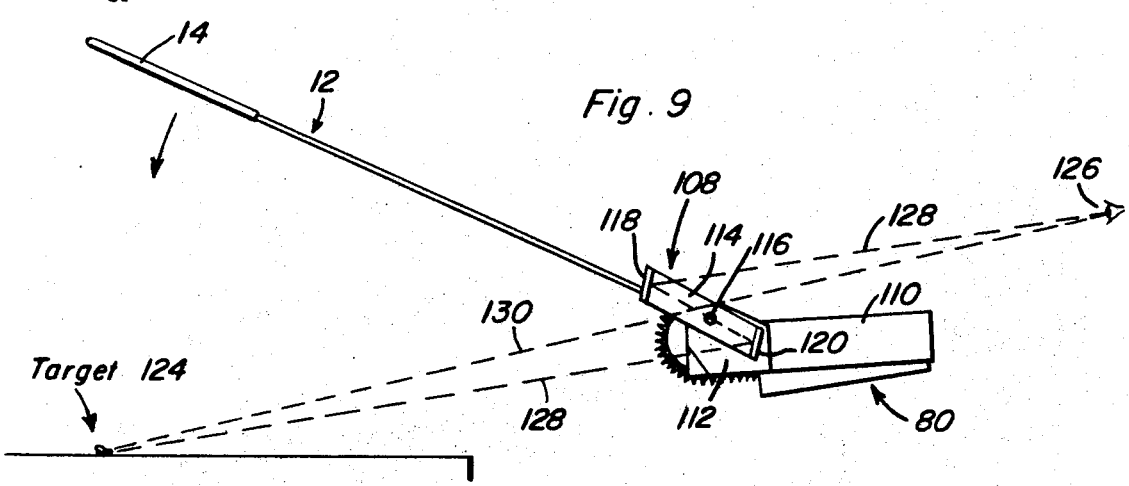

MECHANICAL FLY SWATTER

This invention relates to mechanical spring powered fly swatters.

Spring actuated, fly swatter operating devices have heretofore been proposed as disclosed for example in U.S. Pat. No. 3,292,299 to Mettler. Such fly swatter operating devices have however been relatively expensive to manufacture because of the number of parts involved and the special apparatus required for fabricating the various parts. Also, such prior spring actuated fly swatters have required the exertion of a considerable force by the user in order to operate the fly swatter pad. It is therefore an important object of the present invention to provide a spring actuated operating device for a fly swatter constructed from less parts, many of which, are standard and requiring the use of less force on the part of the user.

In accordance with the present invention, a conventional manual fly swatter is secured to a pivot wheel rotatably mounted at the forward end of a frame member which protectively encloses an actuating spring. The actuating spring extends forwardly from the frame member about the pivot wheel and is connected at one end to the arm of the fly swatter. The other end of the actuating spring is secured to the frame member in spaced relation to the pivot wheel. A trigger element that is biased to a position in which it holds the pivot wheel in a loaded position through a latch pin is engageable within a peripheral notch of the pivot wheel. A conventional caster wheel may be utilized as the pivot wheel while the frame member and trigger element may be folded from sheet metal into a shape convenient for grasping in the hand. The pivot wheel which projects forwardly from the frame member accommodates movement of the swatter through a wide arc of travel under the tension of the actuating spring from a loaded position in which the pivot wheel is held by the trigger release latch. The mechanism is loaded by simply displacing the swatter arm and the pivot wheel to which it is connected toward the loaded position in which the swatter arm extends at an angle to the longitudinal axis of the frame member.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 1 is a perspective view showing the spring actuated, fly swatter device of the present invention in a loaded position.

FIG. 2 is a top plan view of the device shown in FIG. 1.

FIG. 3 is an enlarged side section view taken substantially through a plane indicated by section line 3—3 in FIG. 2.

FIG. 4 is a transverse sectional view taken substantially through a plane indicated by section line 4—4 in FIG. 3.

FIG. 5 is a perspective view showing a modified form of the invention.

FIG. 6 is an enlarged transverse section view taken substantially through a plane indicated by section line 6—6 in FIG. 5.

FIG. 7 is an enlarged side section view taken substantially through a plane indicated by section line 7—7 in FIG. 5.

FIG. 8 is a transverse section view taken substantially through a plane indicated by section line 8—8 in FIG. 7.

FIG. 9 is a simplified side view of the device in use.

Referring now to the drawings in detail, the fly swatter device of the present invention is shown in FIG. 1 and generally referred to by reference numeral 10. The device includes a conventional, manually operated fly swatter generally referred to by reference numeral 12 which includes a swatter pad 14 and a swatter arm 16 constructed from wire. The end of the swatter arm 16 remote from the pad 14, is usually provided with spaced handle rod portions, the inner connected ends of which may be cut in order to secure the swatter arm to the spring operating mechanism.

The spring operating mechanism which is adapted to be grasped in the hand of the user as shown in FIG. 1, includes a frame assembly 20 consisting of a sheet metal frame member 22 and an anchor block 24 which may be made of wood or plastic material. The sheet metal of frame member 22 is folded into a U-shaped cross-sectional configuration, having parallel spaced side portions 26 interconnected by a bottom curved portion 28 as shown in FIGS. 1, 3 and 4. The frame member extends longitudinally between a forward end portion 30 to a rear end 32 and encloses the block 24 which is generally rectangular in shape. The block includes a forward end 34, a rear end 36 which projects rearwardly of the frame member, an upper longitudinal edge portion 38 which also projects above the frame member and a lower edge 40 enclosed within the frame member and spaced from the curved connecting portion 28 of the frame member as more clearly seen in FIG. 3. The upper edge portion 38 of the block is furthermore provided with a recess 42 which extends from the forward end 34. The block is fastened to the side portions of the frame member by spaced fasteners 44 just below the upper edge 46 of the frame member.

The forwarded end 34 of the block is spaced rearwardly of a pivot wheel 48 as more clearly seen in FIG. 3. The pivot wheel may be a conventional caster wheel having a hub 50 through which the pivot wheel is rotatably mounted between the side portions of the frame member at the forward end 30 by a pivot pin 52. The pivot wheel is also provided with a peripheral rim 54 spaced from the hub 50 by the connecting web 56. A notch 58 is formed in the peripheral rim 54.

A trigger element 60 which may be folded from sheet metal and mounted in straddling relation to the pivot wheel and frame member, carries a latch pin 62 adjacent its forward end adapted to be received within the notch 58 of the pivot wheel in order to hold the same in a loaded position as shown in FIG. 3. The trigger element is pivotally mounted on the frame member by a pivot pin 64 located between the pivot wheel 48 and the forward end 34 of the anchor block. A finger release extension 66 projects rearwardly from the trigger element in overlying relation to the recess 42 in the upper edge portion 38 of the anchor block. A return spring 68 secured to the anchor block within slot 70, engages the extension 66 in order to bias the trigger element in a counterclockwise direction as viewed in FIG. 3 thereby holding the latch pin 62 in the notch 58. It will therefore be apparent, that upon depression of the finger release extension 66, into the recess 42, the trigger element 60 will be angularly displaced in a clockwise direction against the bias of the return spring 68 in order to withdraw the latch pin 62 from the notch 58 in the pivot wheel.

The pivot wheel is held by the latch pin 62 in a loaded position under tension of an actuating spring 72. The actuating spring 72 is an elongated tension coil spring having a loop end 74 connected to the swatter arm 16. The actuating spring extends from the end 74 about the peripheral rim 54 of the pivot wheel and then extends tangentially therefrom into the frame member between the lower edge 40 of the anchor block and the curved connecting portion 28 of the frame member. The end portion 76 of the actuating spring opposite the end 74 is connected to a threaded anchor eye 78 secured to the lower edge 40 of the anchor block.

The handle rod portions 18 of the fly swatter arm are secured to the pivot wheel in radially spaced relationship to the pivot pin 52 by means of holes bored in the peripheral rim 54 on either side of the web 56. The holes formed in the rim of the pivot wheel are aligned along a chord in order to receive the handle rod portions 18 of the swatter arm as more clearly seen in FIG. 3. Accordingly, the swatter arm when angularly displaced in a clockwise direction as viewed in FIGS. 1 and 3, will rotate the pivot wheel clockwise to its loaded position in which it is held by the latch pin 62 under the tension of the actuating spring 72. When the actuating pin is withdrawn by depression of the trigger element 60, the spring 72 will angularly displace the swatter pad through a wide arc with a substantial force and relatively rapidly in order to swat an insect. The effort required to release the latch pin through the trigger element, is minimal.

FIG. 5 shows another form of the invention generally referred to by reference numeral 80 that is identical to the previously described device 10 with respect to the conventional fly swatter implement 12 and pivot wheel 48 to which it is anchored and from which it projects. Also, the device 80 includes the same type of actuating spring 72 connected to the swatter arm 16 as in the case of device 10. Also, as in the case of device 10, the pivot wheel 48 is provided with a notch 58 and is rotatably mounted by means of a pivot pin 52 adjacent the upper forward end of an elongated, U-shaped frame member 82 as more clearly seen in FIG. 7. The frame member includes parallel spaced side walls 84 interconnected at the top by a bridging portion 86 that is cut away at the forward end portion of the frame member at 88 in order to accommodate the pivot wheel 48 as shown in FIG. 7.

A latch element 90 is pivotally mounted within the frame member by means of a pivot pin 92 which extends between the side walls 84 of the frame member in rearward spaced relation to the pivot wheel 48. The upper edge of the latch element 90 is provided with a slot 94 receiving a spring element 96 which reacts between the latch element and the inner surface of the bridging portion 86 of the frame member in order to bias the latch element in a clockwise direction as viewed in FIG. 7. The latch element is thereby biased into the notch 58 of the pivot wheel in order to prevent rotation thereof in a counterclockwise direction under the bias of the actuating spring 72. The anchor loop 76 at the end of the actuating spring 72 opposite the connecting loop 74, is anchored to the frame member by means of a pin 98 which is interconnected between the side walls 100 of a U-shaped trigger member 102. The trigger member is pivoted to the frame member by means of a pivot pin 104 adjacent the rear end of the trigger member and the frame member. Further, the trigger member projects downwardly from the frame member and encloses the actuating spring 72 which extends thereinto from its forward end. The forward end of the trigger member also partially encloses the latch element 90 within the frame member and is provided with a release pin 106 which underlies the lower edge of the latch element. Accordingly, upon pivotal displacement of the trigger member in a clockwise direction about its pivot pin 104 relative to the frame member, the release pin 106 will displace the latch element 90 in a counterclockwise direction against the bias of the spring element 96 as viewed in FIG. 7 in order to release the latch element from the pivot wheel 48. This will release the pivot wheel from its loaded position permitting the actuating spring 72 to angularly displace the swatter as hereinbefore described in connection with device 10 in FIGS. 1-4.

The device 80 as shown in FIGS. 5-8, may be simply grasped in the hand and squeezed in order to release the latch element. Thus, the embodiment of device 80 differs from that of device 10 in the manner in which the latch is released.

With reference to FIGS. 5-8 and FIG. 9, it will be observed that the device 80 is provided with a sighting device generally referred to by reference numeral 108. The sighting device is mounted on the frame member by means of a U-shaped bracket 110 which fits over the frame member. Secured to the bracket 110 on one side and projecting from its forward end, is a mounting plate 112. As more clearly seen in FIGS. 5 and 6, an arm 114 is secured to the mounting plate 112 in an angularly adjusted position by means of a frictional pivot pin 116. Parallel spaced flanges 118 and 120 are secured to opposite ends of the arm 114 and mount a pair of reflectors or mirrors 122 in confronting relation to each other.

As more clearly seen in FIG. 9, the sighting device 108 is arranged to pvovide a reflected line of sight between an insect target 124 and the eye 126 of the user. The reflected line of sight indicated by dotted lines 128 is established by the pair of mirrors 122 aforementioned. This reflected line of sight is close to the direct line of sight 130 between the target and the eye as shown in FIG. 9 when the device 80 is held in a proper aligned swatting position. Accordingly, it will be apparent that the sighting device 80 will be useful in holding the device at the proper angle and in alignment with the target.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a swatter having a swat pad and a swatter arm extending therefrom and terminating in a pair of handle rods, a swatter operating mechanism comprising an elongated frame having a forward end portion, an anchor block enclosed by the frame in spaced relation to said forward end portion and secured to the frame, a pivot wheel rotatably mounted in said forward end portion of the frame and to which the swatter arm is connected, an actuating spring entrained about the pivot wheel having opposite ends respectively connected to the swatter arm and the anchor block, latch means engageable with the pivot wheel in a loaded position for holding the same under bias of the spring, and trigger means extending rearwardly from the forward portion of the frame in overlying relation to the anchor block for release of the latch means to permit rotation of the pivot wheel to an unload position under said bias of the spring.

2. The combination of claim 1 wherein said trigger means comprises an element pivoted on the frame between the pivot wheel and the anchor block having a finger extension projecting rearwardly in spaced relation to the block, and means secured to the block biasing the element in a latch engaging direction.

3. The combination of claim 2 wherein said latch means comprises a pin secured to the trigger means and engageable within a peripheral notch formed in the pivot wheel.

4. The combination of claim 3 wherein said pivot wheel comprises a hub rotatably mounted in the frame about a fixed axis, a peripheral rim projecting forwardly beyond the frame having aligned holes within which the handle rods are chordally received in radially spaced relation to the hub, and a web portion interconnecting the hub and the rim.

5. The combination of claim 4 wherein said actuating spring extends rearwardly from the pivot wheel between the block and the frame.

6. The combination of claim 5 wherein said frame includes spaced side portions secured to the anchor block and a curved connecting portion bridging the anchor block in protectively enclosing relation to the actuating spring.

7. The combination of claim 6 wherein said anchor block includes forward and rear ends interconnected by opposite longitudinal edge portions, one of the edge portions projecting from the frame and having a recess extending from the forward end in underlying relation to the trigger means, and means for anchoring the actuating spring to the other of the edge portions within the frame.

8. The combination of claim 1 wherein said pivot wheel comprises a hub rotatably mounted in the frame about a fixed axis, a peripheral rim projecting forwardly beyond the frame having aligned holes within which the handle rods are chordally received in radially spaced relation to the hub, and a web portion interconnecting the hub and the rim.

9. The combination of claim 1 wherein said frame includes spaced side portions secured to the anchor block and a curved connecting portion bridging the anchor block in protectively enclosing relation to the actuating spring.

10. The combination of claim 9 wherein said anchor block includes forward and rear ends interconnected by opposite longitudinal edge portions, one of the edge portions projecting from the frame and having a recess extending from the forward end in underlying relation to the trigger means, and means for anchoring the actuating spring to the other of the edge portions within the frame.

11. The combination of claim 1 wherein said anchor block includes forward and rear ends interconnected by opposite longitudinal edge portions, one of the edge portions projecting from the frame and having a recess extending from the forward end in underlying relation to the trigger means, and means for anchoring the actuating spring to the other of the edge portions within the frame.

12. In combination with a swatter having a swat pad and a swatter arm, an operating mechanism comprising an elongated frame, a pivot wheel rotatably mounted by the frame and projecting forwardly therefrom, means connecting the swatter arm in chordal relation to the pivot wheel, an actuating spring entrained about the pivot wheel having opposite ends respectively connected to the swatter arm and the frame, latch means engageable with the pivot wheel in a loaded position for holding the same under bias of the spring, and trigger means extending rearwardly from the pivot wheel for release of the latch means.

13. The combination of claim 12 wherein said trigger means includes a member pivotally connected to the frame and projecting therefrom in enclosing relation to the actuating spring, and an actuation element mounted by said member within the frame in engagement with the latch means.

14. The combination of claim 13 including a sighting device mounted on the frame.

15. The combination of claim 14 wherein said sighting device includes a pair of reflectors, means mounting the reflectors in spaced confronting relation to each other for establishing a reflected line of sight, and means securing the reflector mounting means to the frame in an angularly adjusted position.

16. The combination of claim 12 including a sighting device mounted on the frame.

17. The combination of claim 16 wherein said sighting device includes a pair of reflectors, means mounting the reflectors in spaced confronting relation to each other for establishing a reflected line of sight, and means securing the reflector mounting means to the frame in an angularly adjusted position.

18. In combination with a swat pad, a frame adapted to be grasped in the hand and on which the pad is movably mounted, an operating mechanism to which the swat pad is connected for displacement along a path transverse to the frame, and an optically reflective sighting device fixedly mounted on the frame for aligning the same in a proper swatting position relative to a target in said path of the pad.

19. In combination with a swat pad, an operating mechanism to which the swat pad is connected having a frame adapted to be grasped in the hand, and a sighting device mounted on the frame for alignment thereof in a proper swatting position relative to a target, said sighting device including a pair of reflectors, means mounting the reflectors in spaced confronting relation to each other for establishing a reflected line of sight, and means securing the reflector mounting means to the frame in a angularly adjusted position.

* * * * *